United States Patent
Liu

(10) Patent No.: US 8,542,006 B2
(45) Date of Patent: Sep. 24, 2013

(54) MOVEMENT DETECTION CIRCUIT OF SOLENOID SHEAR SEAL VALVE ON SUBSEA PRESSURE CONTROL SYSTEM AND METHOD OF DETECTING MOVEMENT OF SOLENOID ACTUATOR

(75) Inventor: Zhen Liu, Houston, TX (US)

(73) Assignee: Hydril USA Manfacturing LLC, Houston, TX (US)

(*) Notice: Subject to any disclaimer, the term of this patent is extended or adjusted under 35 U.S.C. 154(b) by 866 days.

(21) Appl. No.: 12/336,191

(22) Filed: Dec. 16, 2008

(65) Prior Publication Data

US 2010/0148755 A1    Jun. 17, 2010

(51) Int. Cl.
*G01B 7/14*   (2006.01)

(52) U.S. Cl.
USPC ............ 324/207.16; 324/207.24; 324/207.26; 324/226; 324/654; 324/522; 324/76.11; 361/152; 361/154; 361/160; 361/170; 361/187

(58) Field of Classification Search
USPC ................. 324/207.16, 522, 207.24, 207.26, 324/226, 654, 123 R, 76.11; 361/152, 154, 361/160, 170, 187
See application file for complete search history.

(56) References Cited

U.S. PATENT DOCUMENTS

| | | | | |
|---|---|---|---|---|
| 3,858,598 | A * | 1/1975 | Carman et al. ................. | 137/102 |
| 5,600,237 | A * | 2/1997 | Nippert ..................... | 324/207.16 |
| 6,211,665 | B1 * | 4/2001 | Ahrendt et al. ........... | 324/207.16 |
| 7,432,721 | B2 * | 10/2008 | Rober ........................... | 324/522 |

* cited by examiner

*Primary Examiner* — Arleen M Vazquez
*Assistant Examiner* — Son Le
(74) *Attorney, Agent, or Firm* — Bracewell & Giuliani LLP

(57) ABSTRACT

A solenoid current monitoring circuit of a solenoid actuator includes a solenoid drive board configured to receive a control signal, a sensing resistor configured to detect a current signal of a solenoid coil of the actuator resulting from the control signal, and a differentiator configured to differentiate the current signal. The solenoid current monitoring circuit detects the movement of the solenoid actuator based on a change in the differentiated current signal caused by a change in inductance of the solenoid coil.

20 Claims, 6 Drawing Sheets

MOVEMENT DETECTION CIRCUIT OF SOLENOID SHEAR SEAL VALVE ON SUBSEA PRESSURE CONTROL SYSTEM AND METHOD OF DETECTING MOVEMENT OF SOLENOID ACTUATOR

BACKGROUND

1. Field of the Disclosure

Embodiments disclosed herein relate generally to methods and apparatuses to monitor solenoid actuator movement. More particularly, embodiments disclosed herein relate to methods and apparatuses to monitor solenoid actuator movement through current monitoring.

2. Related Art

In sub-sea electrical/hydraulic pressure control systems used, for example, in a BOP system (blowout prevention system) of a drilling rig, solenoid actuators are used to open and/or close hydraulic paths connected to hydraulic valves which control the mud flow through a wellbore. For example, when unexpected high pressure gases are detected when drilling for oil, a control signal is sent to a solenoid control circuit to close or open one or more critical valves so that mud flow can be blocked to prevent people on a drilling ship or platform from being injured or killed by the uncontrolled flow of high temperature mud. Often times, in such subsea systems, several groups of solenoids are used as control switches. Conventionally, the current passing through a solenoid coil is monitored to determine if the correct current level fed to a given solenoid coil for the opening or closing action of the solenoid actuator. This existing solenoid current monitoring method does not confirm if the solenoid actuator has properly moved or not due to, for example, a mechanical failure.

Conventional solenoid current monitoring circuits include a plurality of channels, each of which may be corrected to an individual solenoid coil connected to a corresponding current sensing element. Usually, the sensing element includes a resistive element (e.g., a simple resistor disposed in series with the solenoid coil), the voltage drop across the resistor being proportional to the current flowing through the solenoid coil. In these conventional circuits, the voltage across the resistor is conditioned and read by an analogue to digital converter (ADC), and this voltage measurement is used to determine a current value for the current passing through the solenoid coil.

Solenoid current monitoring circuits such as the type described above typically monitor and report the value of the current that passes through a solenoid coil after its energizing or de-energizing process is completed. Thus, as already noted, existing control systems report the working status of a solenoid coil without detecting any actual physical movement of the solenoid actuator (i.e., existing methods for monitoring current in a solenoid coil do not detect whether the solenoid actuator actually extends or retracts). Thus, if a mechanical failure occurs on the solenoid actuator, the existing current monitoring circuits may report that the solenoid actuator is "working" because the correct current value may still be detected in the solenoid coil although the actuator may have not moved.

Position sensors or motion sensors may be installed on a solenoid coil to sense the movement of the actuator. The signal from the sensors are fed back to the central system to determine if the solenoid actuator moved according to the control signal. To implement such position and/or motion sensors, the solenoid actuator and its housing must be redesigned mechanically to mount the sensor, and extra wires must be used for power/signal lines to connect to the position and/or motion sensor. In other words, major modifications are necessary to carry out the motion detection of the solenoid coil.

SUMMARY

In one aspect, the present disclosure generally relates to a solenoid current monitoring circuit of a solenoid actuator. The solenoid current monitoring circuit includes a solenoid drive board configured to receive a control signal, a sensing resistor configured to detect a current signal of a solenoid coil of the actuator resulting from the control signal, and a differentiator configured to differentiate the current signal. The solenoid current monitoring circuit detects the movement of the actuator based on a change in the differentiated current signal caused by a change in inductance of the solenoid coil.

In another aspect, the present disclosure generally relates to a method for determining movement of a solenoid actuator. The method includes transmitting a control signal to a solenoid drive board, obtaining a current signal from a solenoid coil of the actuator resulting from the control signal, differentiating the current signal to obtain a pulse. The pulse is generated by a change in the differentiated current signal caused by a change in inductance of the solenoid coil upon the movement of the actuator, and reporting the movement of the actuator based on detection of the pulse.

In another aspect, the present disclosure generally relates sub-sea pressure control systems that include a hydraulic flow path; a hydraulic valve in flow communication with the hydraulic flow path; a solenoid actuator connected to the hydraulic valve; and a solenoid current monitoring circuit configured to monitor a current of the solenoid actuator, the solenoid current monitoring circuit further including, a solenoid drive board configured to receive a control signal, a sensing resistor configured to detect a current signal of a solenoid coil of the actuator resulting from the control signal, and a differentiator configured to differentiate the current signal, wherein the solenoid current monitoring circuit detects movement of the actuator based on a change in the differentiated current signal caused by a change in inductance of the solenoid coil.

The above brief description sets forth features of the various embodiments of the present invention in order that the detailed description that follows may be better understood, and in order that the present contributions to the art may be better appreciated. There are, of course, other features of the invention that will be described hereinafter and which will be for the subject matter of the appended claims.

In this respect, before explaining several embodiments of the invention in detail, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and technology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

Further, the purpose of the foregoing Abstract is to enable a patent examiner and/or the public generally, and especially scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

Other aspects of the invention will be apparent from the following description and the appended claims.

BRIEF DESCRIPTION OF DRAWINGS

Embodiments of the present disclosure are discussed with reference to the drawings. Specifically, features of the present disclosure will become more apparent from the following description in conjunction with the accompanying drawings, in which.

DETAILED DESCRIPTION

Figure 1:
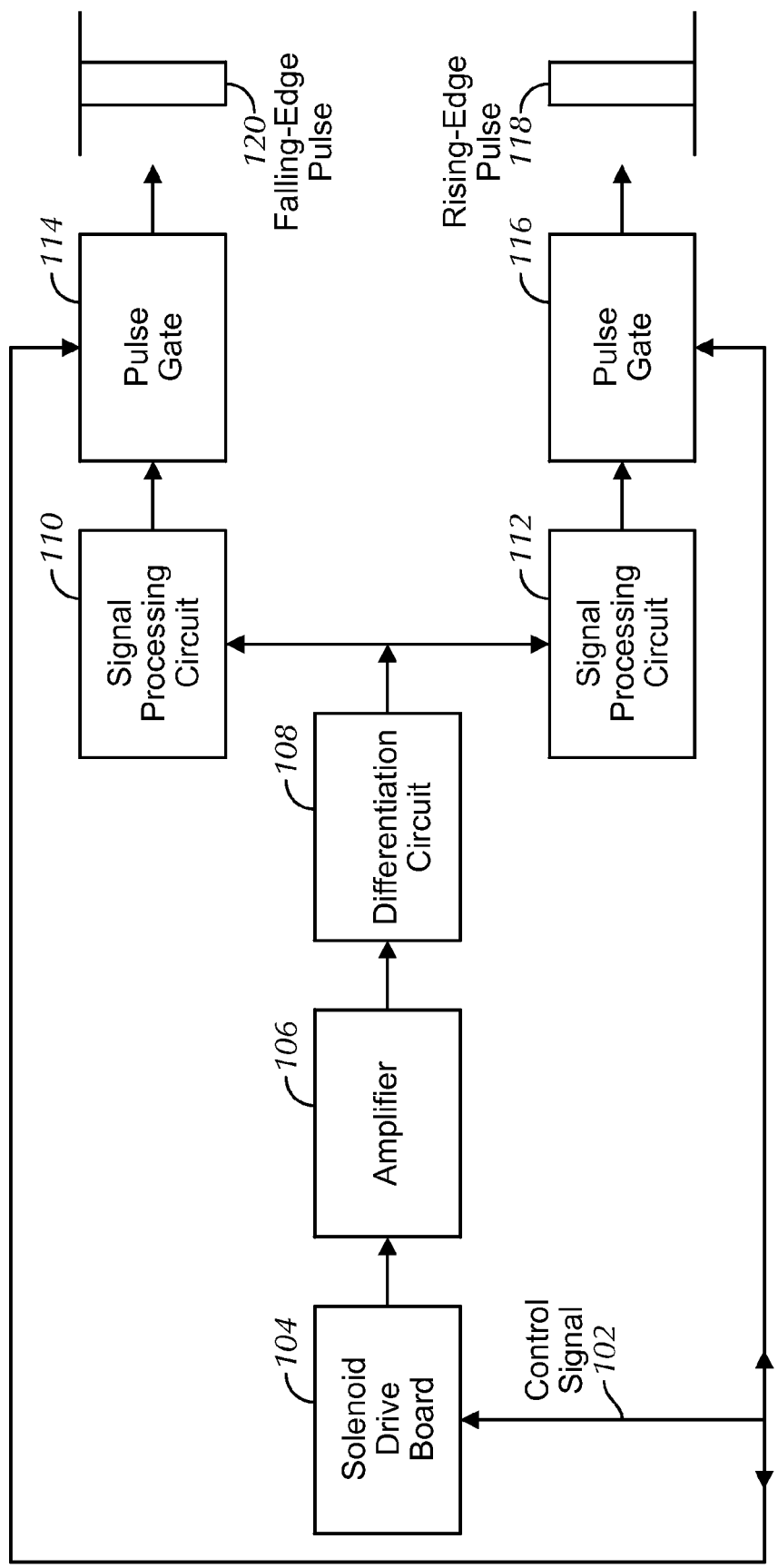
FIG. 1 shows a block diagram for a solenoid current monitoring circuit in accordance with embodiments disclosed herein.

Specific embodiments of the present disclosure will now be described in detail with reference to the accompanying figures. Like elements in the various figures are denoted by like reference numerals for consistency.

In the following detailed description of embodiments of the present disclosure, numerous specific details are set forth in order to provide a more thorough understanding of the subject matter disclosed herein. However, it will be apparent to one of ordinary skill in the art that the subject matter disclosed may be practiced without these specific details. In other instances, well-known features have not been described in detail to avoid unnecessarily complicating the description.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a gas turbine connected to a generator to form a plant assembly on a barge. However, the embodiments to be discussed next are not limited to these systems, but may be applied to other plant assemblies that include heavy devices that require easy and safe access and also a good alignment among the various devices. The exemplary embodiments also apply to devices that are located on the ground.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In general, embodiments of the disclosure relate to detecting movement of an actuator using a solenoid monitoring circuit. More specifically, embodiments of the present disclosure relate to a solenoid monitoring circuit that reports whether the solenoid actuator physically moved according to a current signal of a solenoid coil by detecting a change in the rate of change of a falling or rising current of the solenoid coil caused by inductance changes following the detection of the current signal by the circuit. The actuator utilizing the solenoid monitoring circuit may include, e.g., an armature and a solenoid coil biasing the armature. When current flows through the solenoid coil, the resulting magnetic field may produce a force on the armature and cause the actuator to move. The subject matter of the present disclosure, however, is not limited to any particular actuator. Other solenoid actuators as are well known in the art may also be used.

One or more embodiments disclosed herein provide a solenoid monitoring circuit that detects movement of a solenoid actuator located in a subsea electrical system without additional mechanical and harness/wiring hardware connected to the solenoid circuit and/or the solenoid housing. The solenoid actuator may be an electric solenoid actuator as is well known in the art, and may include, e.g., an armature and a solenoid coil biasing the armature. In one embodiment, Ohm's Law and Kirkoff's Circuit Laws may be used to obtain the variation of current with time in a first-order portion of the solenoid monitoring circuit to detect motion of the actuator, as explained further below. More specifically, the movement of the actuator in the solenoid current monitoring circuit may be determined using the relationship $V(t)=L[di(t)/dt]+R\ i(t)$, where $V(t)$ is voltage, $I(t)$ is current, R is resistance, and L is inductance.

FIG. 1 shows a block diagram of a solenoid current monitoring circuit in accordance with one or more embodiments of the present disclosure. The block diagram of FIG. 1 includes a solenoid drive board (104), an amplifier (106), a differentiator (108), signal processing circuits (110, 112), and pulse gates (114, 116). Each of the aforementioned components of the solenoid current monitoring circuit is described in detail below.

The solenoid drive board (104) is configured to receive a control signal (102) sent by a control system (not shown) to a solenoid circuit located on the solenoid drive board (104). Those skilled in the art will appreciate that solenoid drive boards may exist in subsea electrical systems as are well known in the art, such as a Mux Pod. In one embodiment disclosed herein, the monitoring circuit is integrated with the solenoid drive board.

In embodiments disclosed herein, the solenoid drive board includes a current sensor on the last stage of the solenoid drive board. The amplifier (106) is configured to enlarge a current signal and read out the solenoid current value monitored by the sensor on the solenoid drive board. Those skilled in the art will appreciate that the signal that is amplified may also be referred to as a voltage signal because when the current signal passes through a resistor, a voltage drop is generated. The differentiator (108) includes circuitry to differentiate the amplified voltage/current signal fed from the amplifier (106). Initially, when the control signal 102 is received, the current through a portion of the monitoring circuit starts to change according to the initial values of the resistance and inductance, and the actuator starts moving. When the solenoid coil is energized or de-energized (i.e., when power is provided or removed to/from the solenoid coil), for example, the armature of the actuator may move into/away from the solenoid coil, causing the actuator to move. The movement of the actuator results in a change in inductance value of the solenoid coil, resulting in a change in the rate of change of the current signal. Differentiating the amplified current signal results in the detection of this change in the rate of change of the current signal. More specifically, differentiating the current signal results in a pulse which is captured by the solenoid current monitoring circuit and used to confirm movement of the actuator.

Continuing with FIG. 1, the signal processing circuits (110, 112) are configured to condition the pulse generated by differentiating the current signal. Conditioning the pulse results in refining of the pulse signal. Specifically, signal processing circuit (110) allows only a falling-edge pulse to pass through and signal processing circuit (112) allows only a rising-edge pulse to pass through. Said another way, the signal processing circuits (110, 112) create a direction window through which the pulses generated from energization/de-energization of the solenoid coil are distinguished. Finally, the pulse gates (114, 116) are configured to remove extraneous pulses and noises to refine the detected pulse. The rising-edge or falling-edge pulse detected is then output (118, 120). In one or more embodiments disclosed herein, the pulse gates may be mono-stable vibrators controlled by a solenoid control signal, which only pass pulses closer to control signal 102.

Figure 2:
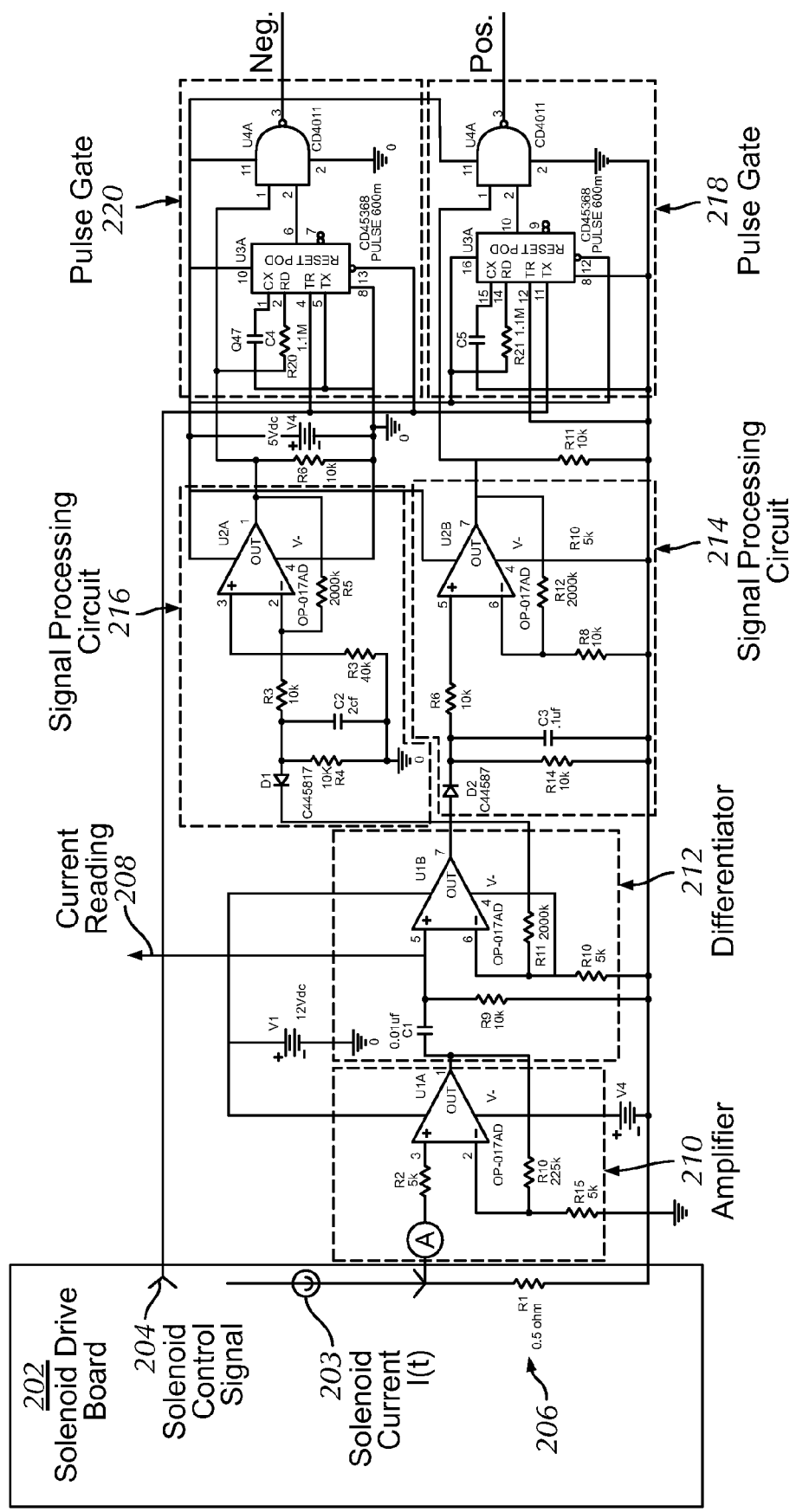
FIG. 2 shows a solenoid current monitoring circuit in accordance with embodiments disclosed herein.

FIG. 2 shows a schematic diagram of a solenoid current monitoring circuit in accordance with one or more embodiments of the present disclosure (the values shown in the schematic diagram are for example purposes, and the subject matter of the present disclosure is not limited to these specific values). More specifically, FIG. 2 shows all exemplary implementation of a diagram of the solenoid current monitoring circuit of FIG. 1. A solenoid current (203) may be measured using the resistor R1 (206) of the solenoid circuit. R1 (206) is known as a sensing resistor because R1 (206) senses the change in the current signal when the current signal passes through R1 (206). At stage (A) of the solenoid current monitoring circuit, a control signal (204), which is a voltage signal, is transmitted to the solenoid circuit. The voltage signal provides a DC voltage to the solenoid coil. When the DC voltage is applied, a current begins traveling through the solenoid coil. The first point in which the current signal is detected is R1 (206), using principles of V(t)=I(t) R[constant]. Before the control signal is sent, the solenoid coil is associated with an inductance value L1. L1 represents the initial inductance of the solenoid coil. Upon transmission of the control signal, however, the solenoid coil is energized, and the armature of the actuator moves into the solenoid coil, causing a change in the solenoid coil inductance. This changed inductance value is L2, where L2 is greater than L1 if the solenoid coil is energized or less than L1 if the solenoid is de-energized.

Continuing with FIG. 2, the current signal associated with the solenoid current (203), is subsequently amplified by the amplifier (210). In embodiments disclosed herein, the solenoid stable current reading (208) may be reported by a feedback signal that is sent back to the control system at the surface. Next, the amplified current signal is differentiated by the differentiator (212) to obtain a pulse. In embodiments disclosed herein, the pulse generated may be a rising-edge pulse or a falling-edge pulse. A falling-edge pulse is generated when the solenoid coil is energized, because the rate of change of the current signal drops with an inductance increase when the armature of the actuator moves into the solenoid coil (as shown, e.g., in the current waveform of FIG. 3). The drop in the current change rate results in a falling-edge pulse upon differentiation of the current signal. Similarly, a rising-edge pulse is generated when the solenoid coil is de-energized, because the current falling ratio increases with an inductance decrease when the armature of the actuator moves out of the solenoid coil (as shown, e.g., in the current waveform of FIG. 4), resulting in a rising-edge pulse upon differentiation. Two signal processing circuits (214, 216) each identify either the rising-edge or falling-edge pulse obtained upon differentiation of the current signal.

Those skilled in the art will appreciate that the rising-edge pulse may be captured by the signal processing circuit (214) and pulse gate (218) and a falling-edge pulse may be captured by the signal processing circuit (216) and the pulse gate (220), or vice versa. Those skilled in the art will also appreciate that the diodes represented by D1 and D2 in FIG. 2 are used to permit the signal to travel through in one direction and be substantially blocked in the other direction. As shown in FIG. 2, the diodes are biased in opposite directions so that each signal processing circuit (214, 216) receives either only rising-edge pulses or only falling-edge pulses. From each of the signal processing circuits, mono-stable vibrators (i.e., pulse gates) controlled by the control signal (204) are used to filter out any noises.

The solenoid current monitoring circuit of FIG. 2 utilizes the inductive properties of a solenoid coil to identify a rising-edge or a falling-edge pulse during different current rising or falling rate transitions caused by changing inductances due to movement of the solenoid actuator. When the solenoid coil is energized, the armature of the actuator of the solenoid moves into the solenoid coil, changing the inductance from the original inductance L1 to a changed inductance of L2. When the armature of the actuator leaves the solenoid coil upon de-energizing of the solenoid coil, the inductance of the solenoid coil returns to the original value of L1.

A change in inductance also means a change in the rate of change of current through the inductor L. Therefore, based on the change in the rate of change of the current through the inductance of the solenoid coil, physical movement of the solenoid actuator is detected. More specifically, the variation of current as a function of time (i.e., the current waveform) in the solenoid coil changes for different inductance values. The current waveform I(t) has a different time constant for different inductances, and therefore the rate of change of the current waveform is also different. The time constant, $\tau$, of the current waveform is calculated by:

$$\tau = L/R,$$

where L is inductance and R is the resistor value. Further, the relationship between the time constant and the current as a function of time is also known as:

$$I(t) = I_{max}(1 - e^{-t/\tau}) = V/R(1 - e^{-t/\tau}).$$

Figure 3:
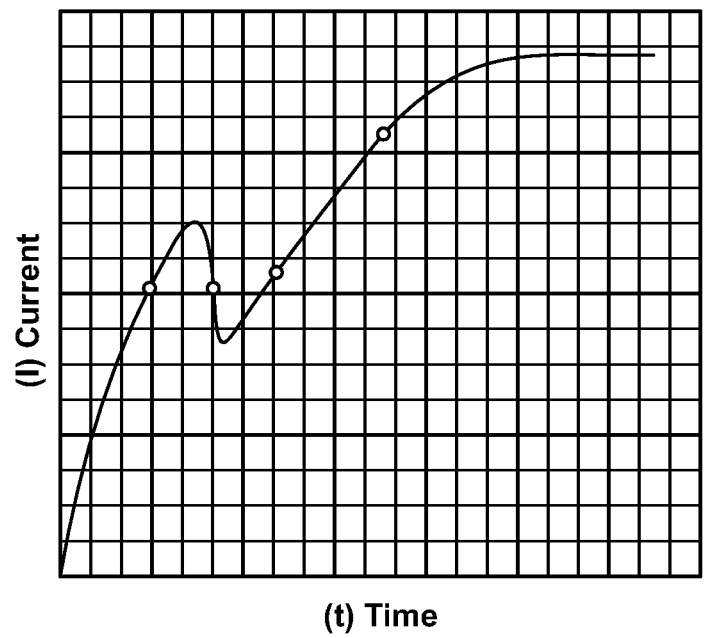
FIG. 3 shows the variation of current as a function of time for an energized solenoid coil in accordance with embodiments disclosed herein.
Figure 4:
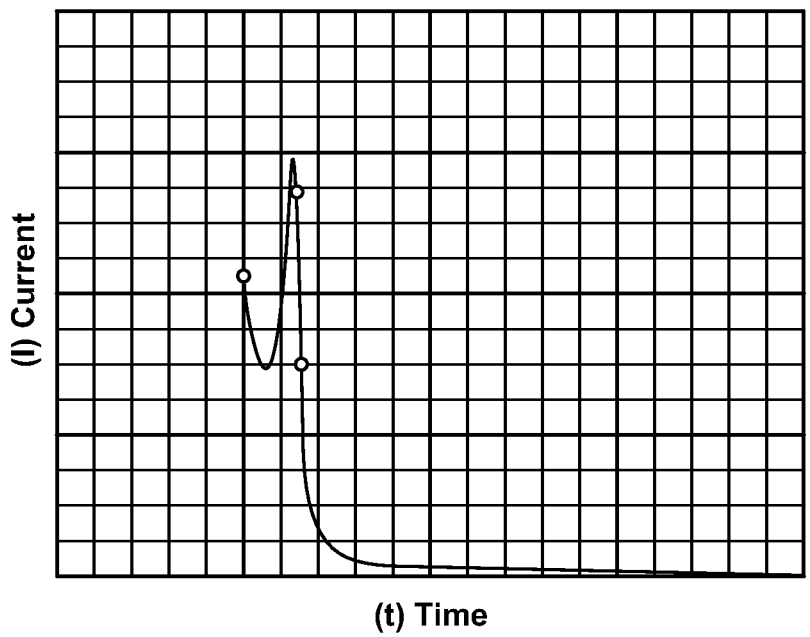
FIG. 4 shows the variation of current as a function of time for a de-energized solenoid coil in accordance with embodiments disclosed herein.

FIG. 3 shows a graph of the current waveform I(t) when the solenoid coil is energized. FIG. 4 shows the current waveform I(t) when the solenoid coil is de-energized. From FIGS. 3 and 4, the current change rate of the current signal may be determined. In FIG. 3, when the actuator moves due to the armature being pressed into the solenoid coil, a sudden drop in the current change rate may be observed. In FIG. 4, when the actuator moves back due to the armature being released from the solenoid coil, a sudden increase in the current change rate may be observed. The change in the current change rate may be determined by differentiating the current signal waveforms shown in FIGS. 3 and 4. Depending on the inductance of the solenoid coil, the slope of the current waveform, and therefore the current change rate, shown in FIG. 3 varies. For a larger inductance, the rate of change in current is slower than for a smaller inductance value. Therefore, when the solenoid actuator moves, the rate of change in the current changes, and this change is represented by a sudden drop/rise in the rate of change of the current signal, as may be observed in FIGS. 3 and 4.

Those skilled in the art will appreciate that the current waveforms shown in FIGS. 3 and 4 may vary depending on the type of solenoid coil. However, the general shape of the waveform applies to any solenoid coil. That is, the energizing of the solenoid coil results in a sudden drop in the current waveform, while the de-energizing of lie solenoid coil results in a sudden increase in the current waveform. By analyzing the waveforms and using the solenoid current monitoring circuit to detect change in the rate of change of the current over time, physical movement of the solenoid actuator can be detected and reported. Using the equations and relationships described above, the pulses produced during different current rising or falling rate transitions are detected by the improved solenoid current monitoring circuit disclosed in embodiments herein, enabling the solenoid current monitoring circuit to report the solenoid current reading and whether any physical movement of the solenoid actuator occurred.

Those skilled in the art will appreciate that detecting a solenoid current value and physical movement of a solenoid actuator may occur in one of several ways. For example, the solenoid current monitoring circuit may include a feedback signal that represents the current value and a Boolean value indicative of whether the solenoid actuator moved during energizing/de-energizing of the solenoid. Further, the feedback information may subsequently be displayed on a visual display or computing device for observation or further analysis. In one or more embodiments disclosed herein, the solenoid drive board may be modified to include a detection flag which reports solenoid actuator movement. The detection flag may be implemented as a flip-flop circuit. More specifically, the pulse outputs of the pulse gates shown in the circuit of FIG. 2 may be inputs to standard flip-flop circuits, where for example, the rising-edge pulse is fed into a falling edge triggered flip-flop and the falling-edge pulse is fed into a rising edge triggered flip-flop. Both flip-flops may include, as an output, a flag to indicate the solenoid actuator movement. Those skilled in the art will appreciate that the flip-flop circuits (not shown) may be implemented in the circuit diagram after the pulse gates, where the rising-edge or falling-edge pulse would be an input into one of the two flip-flops.

Figure 5:
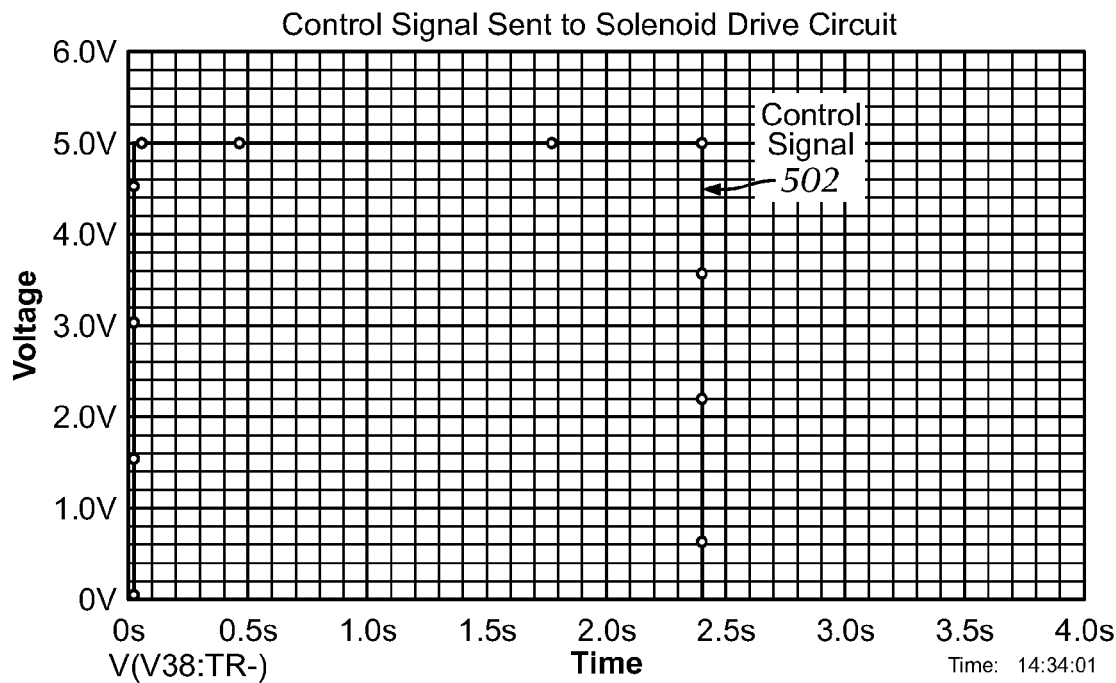
FIG. 5 shows a simulated control signal sent to a solenoid coil in accordance with embodiments disclosed herein.

FIGS. 5-8 show simulation diagrams for a solenoid current monitoring circuit in accordance with one or more embodiments of the present disclosure. Specifically, FIG. 5 shows a graph of the control signal (502) sent from the surface control system, which energizes and de-energizes a given solenoid. FIG. 5 corresponds to the solenoid current sensing signal of FIG. 6 (described below). When the solenoid coil is energized, the control signal sent by the software of the control system is "1" and when the solenoid coil is de-energized, the control signal is "0." As described above, the control signal is sent to the solenoid circuit(s) (e.g., in a subsea system) when one or more switches are to be closed or opened. The movement of the solenoid actuator, upon receiving the control signal, closes or opens the switches. As shown in the signal diagram, the control signal (502) is ramped to 5 V at t=0, held for 2.4 s, and then reduced to zero to power off (de-energize) the solenoid coil.

Figure 6:
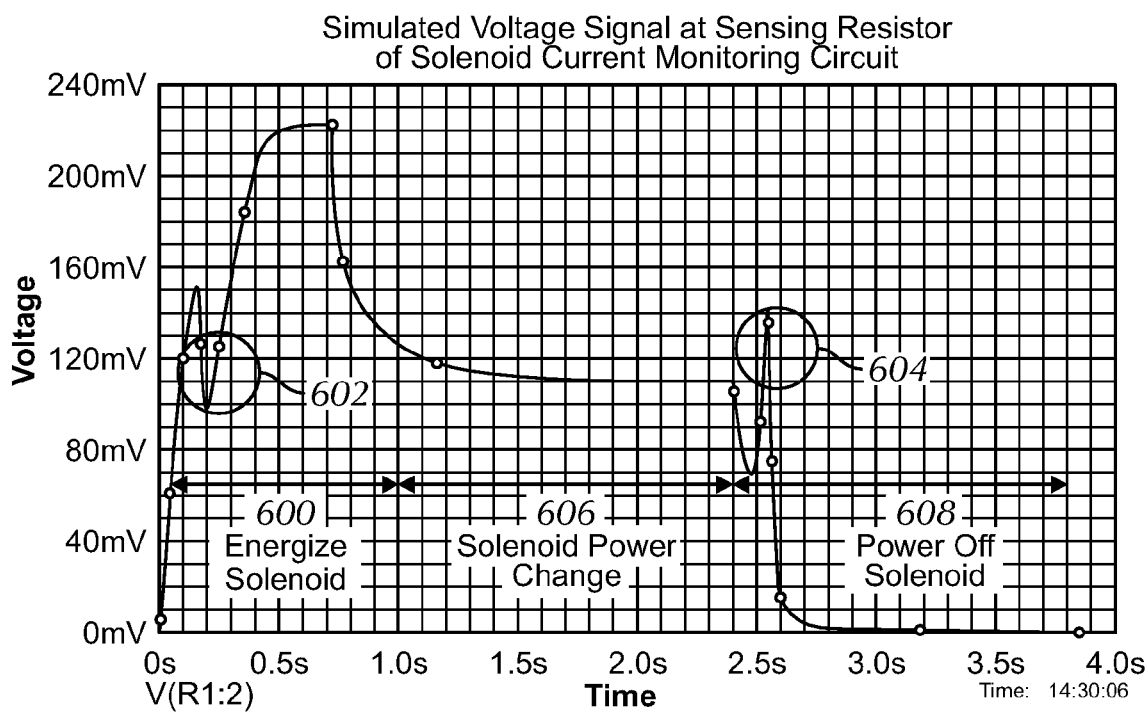
FIG. 6 shows a simulated variation of current (read out from a sensing resistor as a voltage variation) as a function of time across a resistor in a solenoid current monitor circuit in accordance with embodiments disclosed herein.

FIG. 6 shows a simulated output voltage on a current sensing resistor R1 (see FIG. 2) when energizing and subsequently de-energizing a solenoid coil. Specifically, FIG. 6 shows a voltage (detected by current sensing resistor R1) vs. time diagram that is used to report the solenoid current changes. Those skilled in the art will appreciate that the diagram of FIG. 6 plots voltage over time because, when the current passes through the sensing resistor in the RL solenoid coil, one of the values that may be measured is voltage, using die relationship $V(t)=I(t) R1$ (Ohm's Law) and $I(t)=V_o/R(1-e^{-t/\tau})$, where $V_o$ is the power applied to the solenoid coil. Thus, the current signal can be represented by a voltage diagram. In the example simulation result shown in FIG. 6, the initial power $V_o$ applied to the solenoid circuit was 60 VDC (control signal), which was subsequently changed to 30 VDC and held, e.g., for energy saving. The current sensing resistor R1 is 0.5 Ohm, while the resistance R of the solenoid coil is 133 Ohms. Thus, the maximum current passing through the 0.5 Ohm sensing resistor was approximately 449 mA (60 V/133.5 ohm) at the initial 60 VDC power, then dropped to approximately 225 mA (30 V/133.5 ohm) at 30 VDC power, resulting in a voltage at the sensing resistor of approximately 225 mV (449 mA×0.5 ohm) at the beginning, which then dropped to approximately 112 mV (shown in the result diagram of FIG. 6).

In FIG. 6, three stages of the solenoid coil are shown. The first stage, in which the solenoid coil is energized (600), occurs at t=0 s. At this stage, the actuator moves into the solenoid coil, as indicated by the change in current shown at (602). More specifically, FIG. 5 shows at (502) the sudden drop in current that occurs when the solenoid coil is energized, which when differentiated, results in a falling-edge pulse. When the armature of the actuator moves into the solenoid coil, the solenoid coil undergoes a power change (606) at t=0.7 s (e.g., in FIG. 6, this is shown as a drop in voltage from approximately 225 mV to approximately 112 mV). Next, the solenoid coil is powered off (de-energized) at t=2.4 s (via the control signal) (608), and the actuator armature leaves (moves out of) the solenoid coil, as shown by the rising-edge pulse at (604).

Figure 7:
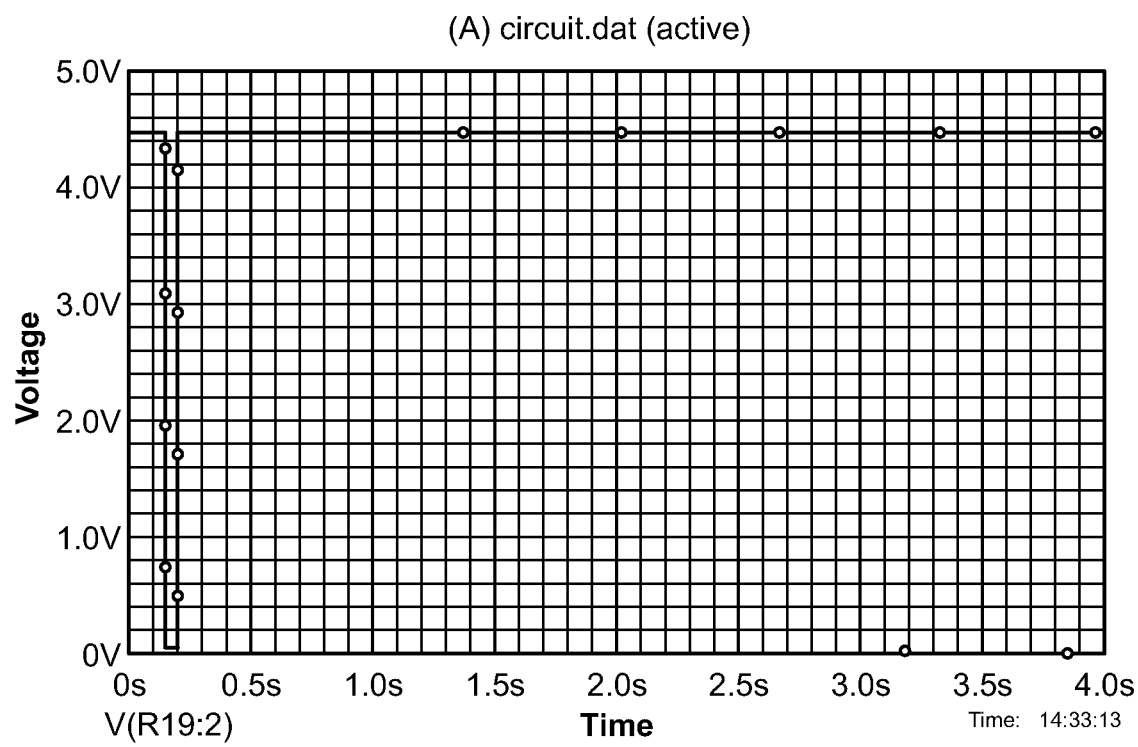
FIG. 7 shows a simulation graph of a falling-edge pulse in accordance with embodiments disclosed herein.
Figure 8:
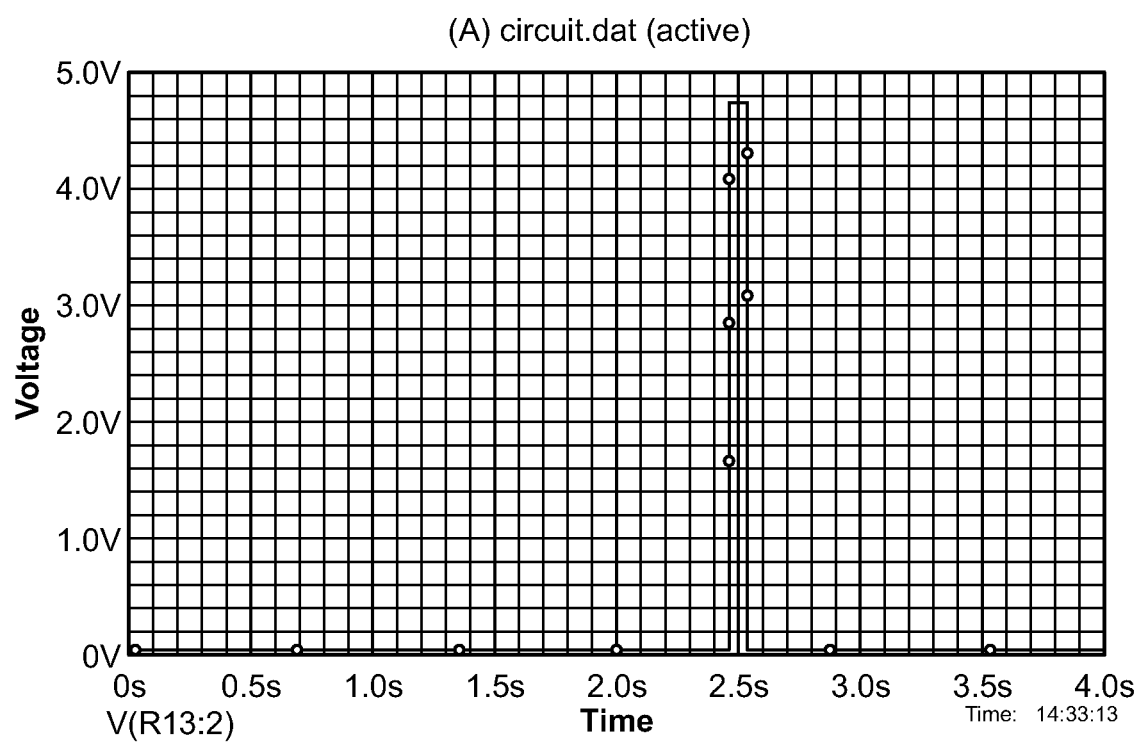
FIG. 8 shows a simulation graph of a rising-edge pulse in accordance with embodiments disclosed herein.

FIGS. 7 and 8 show the falling-edge and rising-edge pulses produced by solenoid actuator movement when it is energized and de-energized, respectively. More specifically, the simulation result graph shown in FIG. 7 corresponds to the top half of the circuit diagram of FIG. 2 (the top portion after the diode D1), when the solenoid coil is energized. Similarly, the simulation result graph shown in FIG. 8 corresponds to the bottom half of the circuit diagram of FIG. 2 (the bottom portion after the diode D2), where the solenoid coil is de-energized.

Figure 9:
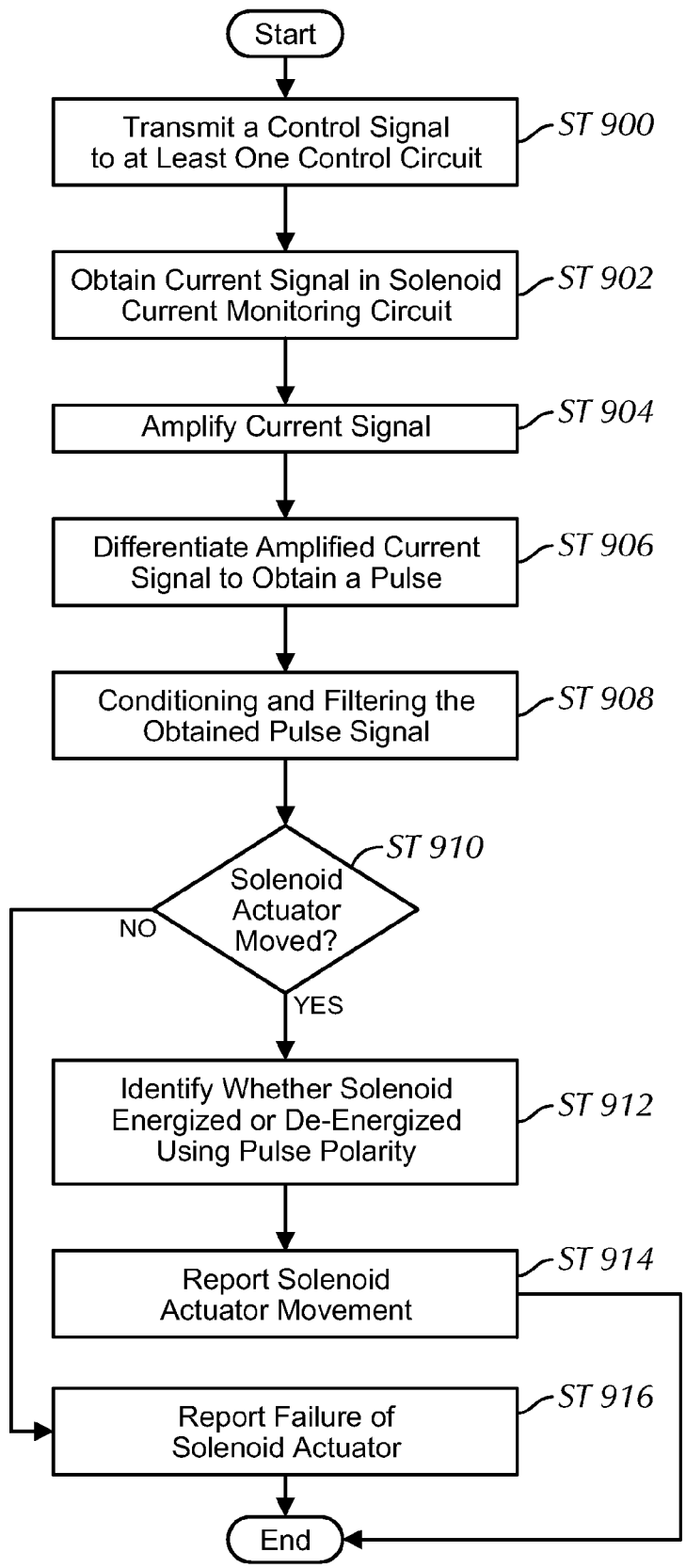
FIG. 9 shows a flow chart of a method for the detection of solenoid actuator movement in accordance with embodiments disclosed herein.

FIG. 9 shows a flow chart describing a method for detecting movement of a solenoid actuator in accordance with one or more embodiments of the present disclosure. While the various steps in the flowchart are presented and described sequentially, one of ordinary skill will appreciate that some or all of the steps may be executed in different orders, may be combined or omitted, and some or all of the steps may be executed in parallel. Accordingly, the specific arrangement of steps shown in FIG. 9 is not meant to limit the scope of the invention.

Initially, a control signal is sent to one or more solenoid control circuits (ST 900). The control signal switches power to the solenoid coil and triggers the armature to move into the solenoid coil to control valve movement. Subsequently, a current signal representing the current flow through the solenoid coil is detected (ST 902). The current signal may be amplified to obtain an amplified current signal (ST 904). The amplified current signal is then differentiated to obtain a pulse, resulting from the change in the rising or falling rate of the current passing through the solenoid sensing resistor (ST 906). The obtained pulse may be conditioned and filtered to get a clean pulse signal (ST908).

At this stage, a decision is made as to whether the solenoid actuator physically moved into a desired position (ST 910). If a proper pulse is obtained, that indicates that the solenoid actuator physically moved, because otherwise, no pulse would be detected. The polarity of the pulse is used to determine/identify whether the solenoid coil energized or de-energized (ST 912), where the falling-edge pulse represents the energizing of the solenoid coil, and the rising-edge pulse represents the de-energizing of the solenoid coil. Thus, movement of the solenoid actuator is reported (ST 914). Alternatively, if the results obtained indicate that the solenoid actuator did not physically move, then failure of the solenoid actuator is reported (ST 91.6).

Those skilled in the art will appreciate that if the proper change in inductance and/or the generation of the proper pulse does not occur or is not detected, then the solenoid actuator may not have physically moved. In this case, solenoid coil movement may not be reported, indicating that although current was monitored in the solenoid coil, the solenoid actuator did not move into its proper position. Thus, in the example described above, the switch in the subsea system may not have been activated (open/closed).

In some embodiments, the solenoid actuator that is being monitored using the solenoid monitoring circuit disclosed herein may be in a subsea location. More particularly, a subsea electronic module (SEM) may include several solenoid drive boards that control opening or closing of subsea switches to prevent high pressure, high temperature drilling fluid (mud) from reaching the surface. Because the physical movement of the actuators may control critical valves that prevent such harmful effects from occurring, it is desirable to ensure that subsea equipment and systems are operating correctly and that no false reporting is being produced. Therefore, it is desirable for a control system to be robust enough to detect physical movement of the solenoid actuator during energizing and de-energizing stages, rather than to simply detect the current in the solenoid coil and report that the solenoid actuator is fully functional based on only the monitored current value.

Advantages of the present invention, in accordance with one or more embodiments, may include one or more of the following.

Embodiments disclosed herein provide a solenoid current monitoring circuit that is capable of detecting physical solenoid actuator movement. Thus, system working status that is reported according to a control signal sent to the solenoid coil can be based on both the monitored current value in the solenoid coil and the solenoid actuator movement. This allows for the detection of a mechanical failure that may occur on one or more moving parts of the solenoid.

Further, the current monitoring circuit of the present disclosure does not require any major mechanical and harness/wiring modification on a Mux Pod assembly or the solenoid housing assembly, because no extra parts need to be added to the assemblies. Rather, the only modification required is on the solenoid drive board, including the signal processing circuits, the pulse gates, and the addition of a flag to report/indicate whether the solenoid actuator has moved.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. A solenoid current monitoring circuit of a solenoid actuator, the solenoid current monitoring circuit comprising:
   a solenoid drive board configured to receive a control signal;
   a sensing resistor configured to provide for detection of a current signal of a solenoid coil of the solenoid actuator resulting from the control signal;
   a differentiator configured to differentiate the current signal;
   a first signal processing circuit configured to separate the differentiated current signal into a rising-edge pulse indicating movement of an armature of the solenoid actuator in a first direction in relation to the solenoid coil; and
   a second signal processing circuit configured to separate the differentiated current signal into a falling-edge pulse indicating movement of the armature of the solenoid actuator in a second direction in relation to the solenoid coil, the second direction being opposite to that of the first direction,
   wherein the solenoid current monitoring circuit detects respective directional movement of the actuator based on a detection of one of the rising-edge pulse and the falling-edge pulse.

2. The solenoid current monitoring circuit of claim 1, further comprising:
   an amplifier circuit positioned and configured to amplify the current signal received by the differentiator.

3. The solenoid current monitoring circuit of claim 2, further comprising:
   a first pulse gate configured to filter electrical noise from the rising-edge pulse; and
   a second pulse gate configured to filter electrical noise from the falling-edge pulse.

4. The solenoid current monitoring circuit of claim 1, further comprising a first flip-flop circuit configured to report physical movement of the actuator in the first direction, and a second flip-flop circuit to report physical movement of the armature in the second direction.

5. The solenoid current monitoring circuit of claim 1, wherein the falling-edge pulse is produced when the solenoid is energized and the rising-edge pulse is produced when the solenoid is de-energized.

6. The solenoid current monitoring circuit of claim 1, wherein movement of the armature in the first direction is movement of the armature away from the solenoid coil, and movement of the armature in the second section is movement toward the solenoid coil.

7. A method of determining movement of a solenoid actuator, the method comprising:
   transmitting a control signal to a solenoid drive board of the solenoid actuator;
   obtaining a current signal from a solenoid coil of the solenoid actuator resulting from the control signal;
   differentiating the current signal to obtain a pulse, wherein the pulse is generated by a change in the differentiated current signal caused by a change in inductance of the solenoid coil upon movement of the actuator;
   separating the current signal, providing a rising-edge pulse when movement of an armature of the solenoid actuator is in a first direction in relation to the solenoid coil and a falling-edge pulse when movement of the armature is in a second direction opposite that of the first direction to thereby distinguish between pulses generated from energization and de-energization of the solenoid coil; and
   identifying directional movement of the actuator based on detection of the rising-edge pulse and the falling-edge pulse, respectively, when occurring.

8. The method of claim 7, further comprising:
   filtering electrical noise from the rising-edge pulse and the falling-edge pulse.

9. The method of claim 7, wherein identifying the directional movement of the actuator comprises using a first flip-flop circuit that receives the rising-edge pulse as an input, and a second flip-flop circuit that receives the falling-edge pulse as an input.

10. The method of claim 7, wherein movement of the actuator activates a subsea hydraulic switch.

11. The method of claim 7, further comprising:
    installing the solenoid actuator in a subsea electrical system to activate hydraulic switches in a subsea pressure control system for blowout prevention.

12. The method of claim 7, wherein movement of the armature in the first direction is movement of the armature away from the solenoid coil, and movement of the armature in the second section is movement toward the solenoid coil.

13. The method of claim 7, wherein the falling-edge pulse is produced when the solenoid is energized and the rising-edge pulse is produced when the solenoid is de-energized.

14. A non-transitory computer readable medium storing computer executable instructions, wherein the instructions, when executed by a processor, causes the processor to perform operations to determine movement of a solenoid actuator, the operations comprising:
    transmitting a control signal to a solenoid drive board;
    obtaining a current signal from a solenoid coil of the actuator resulting from the control signal;
    differentiating the current signal to obtain a pulse, wherein the pulse is generated by a change in the differentiated current signal caused by a change in inductance of the solenoid coil upon movement of the actuator;
    separating the current signal, providing a rising-edge pulse when movement of an armature of the solenoid actuator is in a first direction in relation to the solenoid coil and a falling-edge pulse when movement of the armature is in a second direction opposite that of the first direction to thereby distinguish between pulses generated from energization and de-energization of the solenoid coil; and
    identifying directional movement of the actuator based on detection of rising-edge pulse and the falling-edge pulse, respectively, when occurring.

15. The processor of claim 14, wherein the operations further comprise:
    filtering electrical noise from the rising-edge pulse and the falling-edge pulse; and
    wherein the falling-edge pulse is produced when the solenoid is energized and the rising-edge is produced when the solenoid is de-energized.

16. The processor of claim 14, wherein identifying the directional movement of the actuator comprises using a first flip-flop circuit that receives the rising-edge pulse as an input, and a second flip-flop circuit that receives the falling-edge pulse as an input.

17. A sub-sea pressure control system, comprising:
    a hydraulic flow path;
    a hydraulic valve in flow communication with the hydraulic flow path;
    a solenoid actuator connected to the hydraulic valve, the solenoid actuator being configured to operate the hydraulic valve; and
    a solenoid current monitoring circuit configured to monitor a current of the solenoid actuator, the solenoid current monitoring circuit comprising,
    a solenoid drive board configured to receive a control signal,
    a sensing resistor configured to provide for detection of a current signal of a solenoid coil of the actuator resulting from the control signal,
    a differentiator configured to differentiate the current signal,
    a first signal processing circuit configured to separate the differentiated current signal into a rising-edge pulse indicating movement of an armature of the solenoid actuator in a first direction in relation to the solenoid coil, and
    a second signal processing circuit configured to separate the differentiated current signal into a falling-edge pulse indicating movement of the armature of the solenoid actuator in a second direction in relation to the solenoid coil, the second direction being opposite to that of the first direction,
    wherein the solenoid current monitoring circuit detects respective directional movement of the actuator based on a detection of one of the rising-edge pulse and the falling-edge pulse.

18. The sub-sea pressure control system of claim 17, further comprising:
    an amplifier circuit positioned and configured to amplify the current signal.

19. The sub-sea pressure control system of claim 17, further comprising:
    a first pulse gate configured to filter electrical noise from the rising-edge pulse;
    a second pulse gate configured to filter electrical noise from the falling-edge pulse;
    a first flip-flop circuit configured to report physical movement of the actuator in the first direction; and
    a second flip-flop circuit to report physical movement of the armature in the second direction.

20. The sub-sea pressure control system of claim 17, wherein movement of the armature in the first direction is movement of the armature away from the solenoid coil, and movement of the armature in the second section is movement toward the solenoid coil.

* * * * *